United States Patent [19]
Goldstein

[11] Patent Number: 4,938,026
[45] Date of Patent: Jul. 3, 1990

[54] HEAT ENGINE BASED ON SHAPE MEMORY ALLOYS

[75] Inventor: David Goldstein, Adelphi, Md.

[73] Assignee: The United States of America as represented by the Secretary of the Navy, Washington, D.C.

[21] Appl. No.: 444,350

[22] Filed: Dec. 1, 1989

[51] Int. Cl.⁵ ............................................. F03G 7/06
[52] U.S. Cl. ..................................................... 60/527
[58] Field of Search ........................... 60/527, 528, 529

[56] References Cited

U.S. PATENT DOCUMENTS

| | | | |
|---|---|---|---|
| 3,303,642 | 2/1967 | Lee | 60/527 X |
| 4,010,612 | 3/1977 | Sandoval | 60/527 |
| 4,302,938 | 12/1981 | Li | 60/527 |
| 4,683,721 | 8/1987 | Shin et al. | 60/527 |

Primary Examiner—Allen M. Ostrager
Attorney, Agent, or Firm—Kenneth E. Walden

[57] ABSTRACT

A tubular gear made of shape memory alloy in sheet form, having longitudinal corrugations and being floatingly supported for rotation about an axis fixedly spaced from the rotational axis of a roller gear in meshing engagement with the corrugations. The tubular gear is sequentially deformed by exposure to radiated heat causing the shape memory alloy to expand circumferentially. Said meshing engagement with roller gear and such deformation of the tubular gear within differential temperature regions established by restricted exposure to the radiated heat; induces and sustains rotation of the tubular gear to convert the heat energy into mechanical energy.

16 Claims, 2 Drawing Sheets

HEAT ENGINE BASED ON SHAPE MEMORY ALLOYS

BACKGROUND OF THE INVENTION

This invention relates to a heat engine, and more particularly to the conversion of radiant heat, such as solar energy, into mechanical energy in an engine using special alloys which exist in two distinct crystallographic states with distinctly different mechanical properties. The heat engine of this invention is especially suited to solar energy conversion to mechanical energy in outer space.

A class of alloys, referred to as "shape memory alloys", exist in an austenitic state, characterized by an austenitic crystal structure, above a transition temperature range, and in a martenistic state, characterized by a martenistic crystal structure, below that temperature range. The transition temperature range is specific to the alloy composition and the temperature at which the alloy has been annealed.

In the austenitic state, such alloys exhibit high stiffness. In the martensitic state, on the other hand, they are relatively soft, pliable and easy to deform. When a piece of such an alloy is deformed in its martenistic state and then heated above the transition temeperature range to transform it into its austenitic state, it will "remember" and revert to its shape in its earlier austenitic state, i.e., prior to deformation in the martensitic state exerting considerable force against any restraining objects in doing so and being capable of generating mechanical energy thereby.

Alloys exhibiting "shape memory" include Ag-Cd-, Au-Cd, Au-Cu-Zn, Cu-Al-Ni, Cu-Zn, Ni-Ti, and certain steels. The most important alloy in this class from a practical standpoint is Ni-Ti in approximately 1:1 atomic ratio (53–57 weight percent Ni, 47–43 weight percent Ti) which is referred to as Nitinol, and whose preferred transition temeperature range is from 20 to 60 degrees Celsius.

DESCRIPTION OF PRIOR ART

The properties of shape memory alloys, especially Nitinol, have been extensively studied and applied to the construction of heat engines. U.S. Pat. No. 4,283,233 to Goldstein, Jones and Sery discloses a method of controlling the transition temperature range between the martensitic and austenitic states of Nitinol by annealing the alloy at an elevated temperature. U.S. Pat. No. 3,403,238 to Buehler and Goldstein describes apparatus and a process for converting heat to mechanical energy in the form of lifting forces and twisting moments which perform mechanical work against opposing forces or moments. U.S. Pat. No. 3,913,326 to Banks discloses an engine employing wires of shape memory alloy which are periodically heated and cooled and whose expansion in the heated state is translated into rotary motion. U.S. Pat. No. 4,010,612 to Sandoval describes an engine employing belts made of shape memory alloy connected to pulleys, the belt material being heated and cooled locally at different points in the apparatus, with the change in shape of the belt material on heating causing the pulleys to rotate. U.S. Pat. No. 4,086,769 to Smith discloses a heat engine in which a plurality of spirals of shape alloy memory wire are periodically heated and cooled, whereby the spirals when heated push connecting rods connected to a crankshaft, causing it to rotate.

SUMMARY OF THE INVENTION

The heat engine of this invention comprises a thin sheet of Nitinol material formed into a tube having corrugations acting as gear teeth in mesh with a gear roller having teeth similar to the longitudinal corrugations and in mesh therewith. One side of the tubular Nitinol sheet receives heat from a source of radiant heat, such as the sun, whereby the portion of the Nitinol sheet so exposed to the radiant heat expands circumferentially to induce rotation, as a result of unbalanced forces transmitted to the gear roller in mesh at a point of tangency. The roller is mechanically coupled with a rotating device absorbing the mechanical energy output of the heat engine, e.g., a pump, a compressor, or an electric generator.

BREIF DESCRIPTION OF THE DRAWINGS

DETAILED DESCRIPTION OF THE PREFERRED EMBODIMENT

Figure 1:
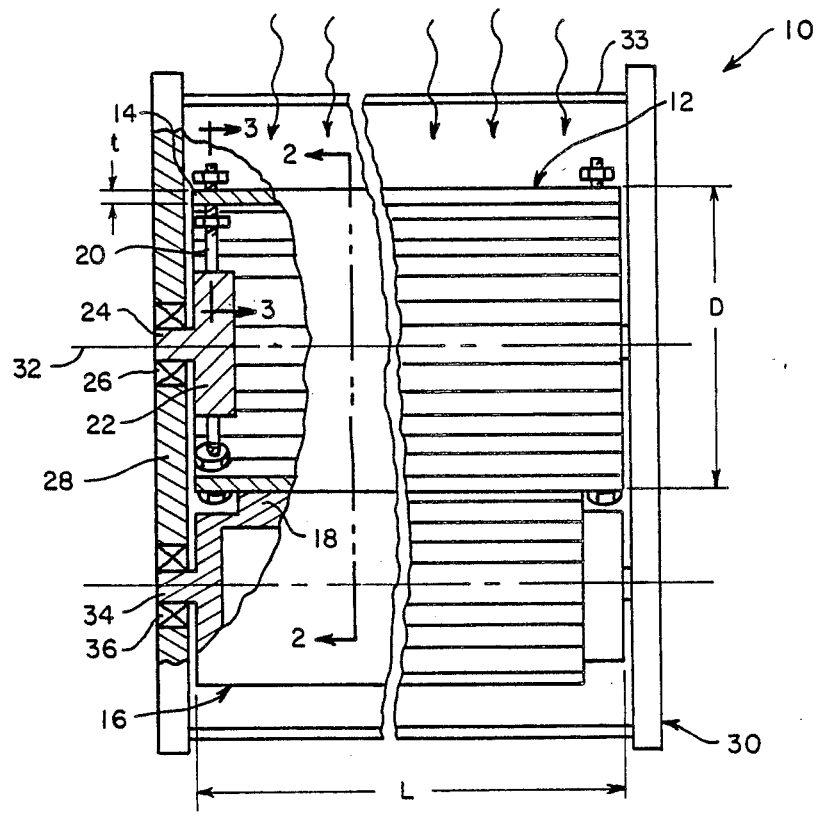
FIG. 1 is a side elevation view of the heat engine of this invention with parts broken away and shown in section.
Figure 2:
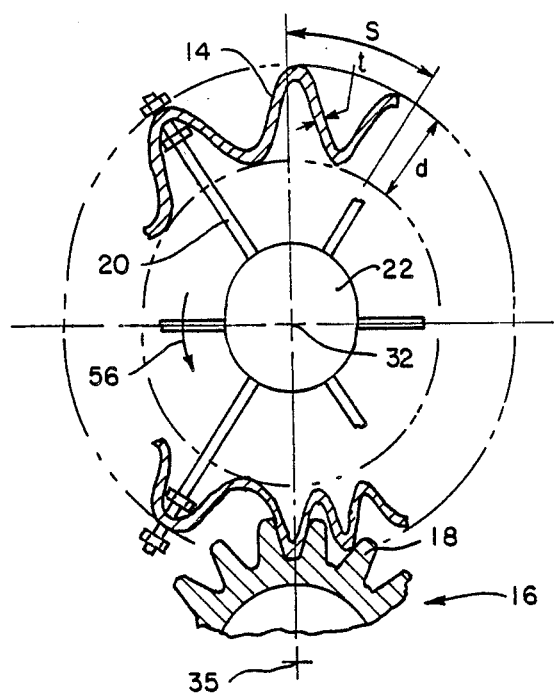
FIG. 2 is a partial section view of the heat engine taken along section line 2—2 in FIG. 1.

The heat engine of this invention, generally referred to by reference numeral 10, comprises a tubular energy input gear 12 having an effective cylindrical diameter D and axial length L as shown in FIG. 1. The tubular gear 12 is made of thin Nitinol sheet material formed with corrugations 14 which extend axially or longitudinally and have in cross-secion a substantially sinusoidal profile, as seen in FIG. 2. The dimensions of the corrugations are defined by their circumferential spacing or pitch S(the distance between two adjacent peaks), their depth d, measured from the peak to the deepest point of the valley, and the sheet material thickness t. The heat engine further comprises a driven tubular roller gear 16 having teeth 18 similar to the longitudinal corrugations 14, in the martensitic state, and in mesh therewith on the side of the tubular gear 12 not exposed to the source of radiant heat energy. Roller gear 16 is made of a relatively rigid and lightweight material, such as graphite.

The corrugations 14 on the tubular Nitinol sheet is in an austenitic state prior to assembly of the engine. The dimensions of the corrugations will be "remembered" by each corrugation 14 as it is transformed from the martenistic to the austenitic state during the subsequent operation of the heat engine.

The tubular corrugated Nitinol sheet forming gear 12 is carried at each end by floating support means such as flexible metal spokes 20 attached to hubs 22 as seen in FIG. 1. According to one embodiment as shown, the spokes are attached to the hubs by brazing or threading. The hubs have shaft extensions 24 rotatably supported in bearings 26 affixed to end plates 28 of a frame assembly generally referred to by reference numeral 30. The tubular gear 12 is thus able to rotate freely about an axis 32 fixedly established between the end plates of the frame assembly. The spacing between and relative alignment of the two end plates 28 is maintained by interconnecting tie rods 33. Optionally, other bracing arrangements may be employed to impart rigidity to the frame assembly. The roller gear 16 is also rotatably supported by the end plates and is provided with shaft extensions 34, journaled by bearings 36 for rotation about an axis 35 fixedly spaced from axis 32. Mechanical energy may be extracted from the engine 10 through such shaft extensions 34 in certain embodiments.

Figure 3:
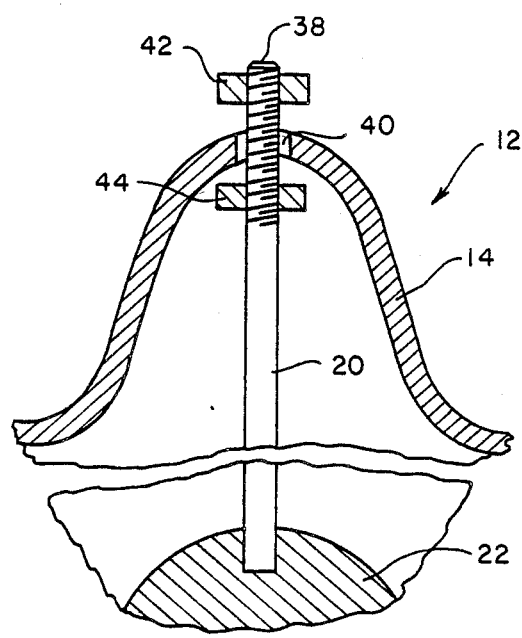
FIG. 3 is an enlarged partial section view of the heat engine taken along section line 3—3 in FIG. 1.

Each of the floating support means for the tubular gear 12, includes a hub 22 and a plurality of the flexible spokes 20, as shown in detail in FIG. 3. Further, axially spaced threads are formed on an end portion 38 of each spoke which projects with clearance through an opening 40 at a peak portion of one of the corrugations 14, in close adjacency to an axial end of the tubular gear. Internally threaded nuts 42 and 44 are located in adjustably fixed positions on the threaded portion 38 of each spoke 20 closely spaced on radially outer and inner sides of the corrugation peak to limit any displacement of the tubular gear relative to its rotational axis 32 extending through the shaft extensions 24.

Figure 4:
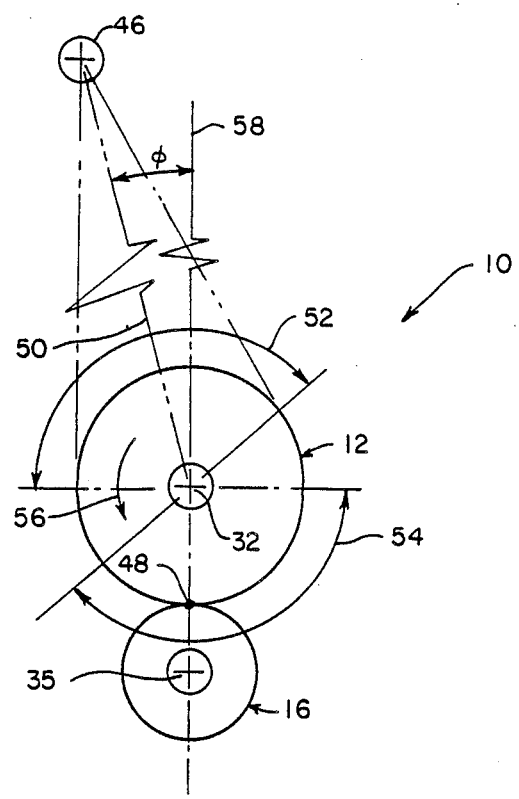
FIG. 4 is a schematic view of the heat engine in space.

As diagrammatically shown in FIG. 4, the Nitinol tubular gear 12 receives heat from a radiation source, such as the sun 46, with the engine 10 oriented so as to expose the side of the tubular gear opposite the side on which the meshing point of tangency 48 is located between the gear roller 16 and tubular gear 12. Methods for so orienting the engine 10 with respect to the direction 50 to the sun are outside the scope of this invention.

The portion of the Nitinol tubular gear exposed to radiation heats up and assumes its austenitic, expanded (AE) state within a thermal heating region denoted by curved arrow 52 in FIG. 4. The side of the Nitinol tube 12 facing away from the radiation source loses heat primarily through radiation to cold surroundings, such as outer space, so as to cool down within a thermally colder region 54 before meshing with the teething 18 of the gear roller 16. Such meshing engagement within the colder region 54 compresses the corrugations 14 into a martenistic compressed (MC) state.

The circumferential pitch spacing of the teeth 18 on the gear roller is smaller that the spacing between the corrugations 14 of the Nitinol tube 12 in its expanded austenitic (AE) (as denoted in FIG. 2), preferably by 20 to 50%. When such dimensionally expanded corrugations 14 approach meshing engagement at tangency point 48 within region 54, the corrugations 14 are compressed into the closer spacing dicated by the teeth 18 of the gear roller 16 as shown in FIG. 2. Such deformation of the corrugations 14 sustains rotation of the tubular gear 12 and gear roller 16 in the direction of arrow 56 under unbalanced forces resulting from expansion of the corrugations in response to exposure to the radiated heat.

As Nitinol tube 12 rotates, the corrugations 14 in the MC state enter the thermal heating region 52 and heat up through absorption of heat from solar radiation undergoing transition to the austenitic state, "remembering" the more expanded spacing in the previous austenitic state. In so doing, the corrugations 14 exiting the region 52 enter the colder region 54 in FIG. 4. Corrugations 14 in the AE state upon entering region 54 cool down and enter the martenistic expanded (ME) state in which the Nitinol material is soft and pliable. In this state, the corrugations 14 mesh with the teeth 18 of the roller 16 at the point of tangency 48 to compress the corrugations 14 as more clearly seen in FIG. 2.

Initial heating of the corrugations 14 of the tubular gear 12 within the heating region 52, while stationary relative to its frame assembly 30, produces a net unbalanced force at the point of tangency 48 because of various unbalanced conditions so as to initiate rotation in one direction as indicated by arrow 56. Such unbalanced condititions, include for example, a slight angular deviation $\Phi$ between the directional line 50 to the radiation source 46 and a line of symmetry 58 extending in perpendicular intersecting relation to the rotational axes 32 and 35. The line of symmetry 58 also intersects the point of tangency 48 and extends through the heating region 52 in 180° angularly spaced relation thereto as depicted in FIG. 4. Other unbalanced conditions result from non-uniform distribution of internal strain within the Nitinol sheet material caused by its heating within region 52 and unequal transmission of forces in opposite directions therefrom toward the point of tangency 48. Once such unidirectional rotation is initiated, sequential deformation of the corrugations 14 by heating and by meshing engagement with the teeth 18 of roller 16 augments the unbalanced force condition to sustain rotation as aforementioned. The temperature differential between region 52 and 54 and the rate at which the corrugations are deformed by the teeth of gear roller 16, will establish an angular speed at which rotation of engine 10 is sustained.

It is contemplated that a Nitinol tube 12 of 50 cm diameter by 1.50m length, when oriented at right angles to the direction 50 of solar radiation in outer space but in the vicinity of earth, intercepts about 1000 watts of such solar radiation. All of such radiant energy is absorbed and converted to heat to raise the temperature of the Nitinol from about 0 degrees Celsius to about 70 degrees Celsius. The Nitinol when converted from its martenistic to its austenitic state, assumes its original shape in the austenitic state, to expand circumferentially and exert a tangential force along the surface of the tubular gear 12 causing rotation thereof.

Numerous modifications and variations of the present invention are possible in light of the foregoing teachings. It is therefore to be understood that within the scope of the appended claims the invention may be practiced otherwise than as specifically described.

What is claimed is:

1. An engine for converting radiated heat energy into mechanical energy comprising a tube made of sheet material with shape memory properties having axially extending corrugations thereon, a toothed roller in meshing engagement with said corrugations within a cold thermal region, frame means for establishing a pair of fixedly spaced axes and means rotatively positioning the tube and the roller on said fixedly spaced axes restrictively exposing the corrugations to the radiated heat energy and producing a temperature differential with respect to the corrugations in said cold thermal region for inducing rotation of the tube and the roller about said fixedly spaced axes.

2. The combination of claim 1 wherein said sheet material is Nitinol having an austenitic state within a thermal heating region to which said exposure of the corrugations to the radiated heat energy is restricted in spaced relation to the cold thermal region within which the Nitinol is in martenistic state.

3. The combination of claim 2 wherein said radiated heat energy is solar radiation.

4. The combination of 3 wherein said roller includes rigie teeth having a pitch spacing less than of that the corrugations during said exposure thereof to the heat energy within the thermal heating region.

5. The combination of claim 4 wherein said rotatively positioning means includes support means floatingly mounting the tube for sequential deformation of the corrugations in response to said exposure thereof to the radiated heat energy and said meshing engagement thereof with the roller.

6. The combination of claim 5 wherein said sequential deformation of the corrugations maintains unbalanced force conditions relative to a line of symmetry interconnecting the fixedly spaced axes to continue said induced rotation of the tube and the roller.

7. The combination of claim 1 wherein said radiated heat energy is solar radiation.

8. The combination of claim 2 wherein said roller includes rigid teeth having a pitch spacing less than that of the corrugations within the thermal heating region.

9. The combination of claim 1 wherein said rotative positioning means includes support means floatingly mounting the tube for sequential deformation of the corrugations in response to said exposure thereof to the radiated heat energy and said meshing engagement thereof with the roller.

10. The combination of claim 9 wherein said sequential deformation of the corrugations maintains unbalanced force conditions relative to a line of symmetry interconnecting the fixedly spaced axes.

11. In combination with a source of radiated heat energy means for converting the heat energy into mechanical energy, comprising: a driven gear, frame means mounting the driven gear for rotation about an axis operatively oriented relative to said source, an energy input gear in meshing engagement with said driven gear and supporting means rotatively mounting the input gear on the frame means in said meshing engagement with the driven gear for establishing differential temperature regions on the input gear in response to exposure thereof to the radiated heat energy within one of said regions, said input gear comprising tubular means sequentially deformed in response to said exposure thereof to the radiated heat energy within said one of the regions and said meshing engagement thereof with the driven gear within the other of the differential temperature regions for maintaining said rotation of the driven gear.

12. The combination of claim 11 wherein said tubular means includes corrugations made of shape memory sheet material with which the driven gear is in said meshing engagement.

13. The combination of claim 12 wherein said frame means establishes another axis, about which the input gear is rotatable in fixedly spaced relation to the first mentioned axis, said axes being in perpendicular intersecting relation to a line of symmetry extending through said differential temperature regions in substantially 180° angular spaced relation to each other on the input gear.

14. The combination of claim 11 wherein said frame means establishes another axis about which the input gear is rotatable in fixedly spaced relation to the first mentioned axis, said axes being in perpendicular intrersecting relation to a line of symmetry extending through said differential temperature regions in substantially 180° angular spaced relation to each other on the input gear.

15. In combination with a source of radiated heat energy, means for converting the heat energy into mechanical energy, comprising a pair of gears and frame means mounting said gears for rotation about fixedly spaced axes in operatively oriented relation to said source, one of said gears comprising tubular means rotatable about one of said axes for restricted exposure to the radiated heat energy within a thermal heating region and deformable means carried by the tubular means in meshing engagement with the other of the gears within a thermally colder region at a predetermined differential to said thermal heating region for inducing rotation of the gears about said fixedly spaced axes.

16. The combination of claim 15 wherein said deformable means is made of sheet material having shape memory properties characterized by an austenitic state thereof within the thermal heating region and a martenisitic within the thermally colder region.

* * * * *